US010430864B2

(12) United States Patent
Bekbolatov et al.

(10) Patent No.: US 10,430,864 B2
(45) Date of Patent: Oct. 1, 2019

(54) TRANSACTION BASED LOCATION ASSIGNMENT SYSTEM AND METHOD

(71) Applicant: POINT INSIDE, INC., Bellevue, WA (US)

(72) Inventors: Renat Bekbolatov, Bellevue, WA (US); Hua Zheng, Bellevue, WA (US); Michael Moricz, Bellevue, WA (US); Joshua Logan Marti, Bellevue, WA (US); Jonathan Alan Croy, Bellevue, WA (US); Keane Watterson, Bellevue, WA (US)

(*) Notice: Subject to any disclaimer, the term of this patent is extended or adjusted under 35 U.S.C. 154(b) by 153 days.

(21) Appl. No.: 15/833,402

(22) Filed: Dec. 6, 2017

(65) Prior Publication Data

US 2018/0365755 A1    Dec. 20, 2018

Related U.S. Application Data

(63) Continuation-in-part of application No. 15/702,595, filed on Sep. 12, 2017, now Pat. No. 10,387,947, which is a continuation of application No. 14/680,963, filed on Apr. 7, 2015, now Pat. No. 9,858,615, which is a continuation-in-part of application No. 14/250,094, filed on Apr. 10, 2014, now Pat. No. 9,824,388.

(51) Int. Cl.
*G06Q 30/00* (2012.01)
*G06F 17/30* (2006.01)
*G06Q 30/06* (2012.01)

(52) U.S. Cl.
CPC ..... *G06Q 30/0639* (2013.01); *G06Q 30/0603* (2013.01)

(58) Field of Classification Search
CPC ................................. G06Q 30/0639
See application file for complete search history.

(56) References Cited

U.S. PATENT DOCUMENTS 8,407,108 B2    3/2013  Foltz
8,923,893 B2    12/2014  Austin

OTHER PUBLICATIONS

Bachtelle, B. (Jun. 2014). How to create your micro market planogram. Automatic Merchandiser, 56, 14-16. Retrieved from http://search.proquest.com/docview/1614634607?accountid=14753.*

\* cited by examiner

*Primary Examiner* — Kathleen Palavecino

(57) ABSTRACT

A transaction based location assignment system creates a complete and more accurate location assignment database for all products available in a store. Transaction data from checkout stands (point of sale terminals) spread around a department store, and the location of each of those checkout stands during POS transactions, is used to create a most probable location of items available in the store. Memory matrixes are built comprising product purchase or transaction information from the checkout stands, and the location of each of the checkout stands, and weighting based on other factors, provide for a best fit match to determine the most probable location within the store of all items within the store. The transaction based location system has the capability to work both for items having a single location in the store, as well as for items available from multiple physical locations in the store.

16 Claims, 11 Drawing Sheets

EACH ROW REPRESENTS A DISTRIBUTION OF CHECKOUT STANDS FOR SAME ITEM.

CHECKOUT STANDS

|  | 1 | 2 | ... | K |
|---|---|---|---|---|
| ITEM 1 | • | • |  | • |
| ITEM 2 | • | • |  |  |
| ... |  |  |  |  |
| ITEM N | • | • |  | • |

MEMORY MATRIX B ~1180

FIG. 7

TRANSACTION BASED LOCATION ASSIGNMENT SYSTEM AND METHOD

The present application is a continuation-in-part of U.S. patent application Ser. No. 15/702,595 entitled "LOCATION ASSIGNMENT SYSTEM AND METHOD", filed Sep. 12, 2017; which in turn is a continuation of U.S. patent application Ser. No. 14/680,963 entitled "LOCATION ASSIGNMENT SYSTEM AND METHOD", filed Apr. 7, 2015; which in turn is a continuation-in-part of U.S. patent application Ser. No. 14/250,094 entitled "LOCATION ASSIGNMENT SYSTEM AND METHOD", the entirety of all of which are expressly incorporated herein by reference.

BACKGROUND OF THE INVENTION

1. Field of the Invention

The present disclosure relates to systems and methods of assigning or anticipating a location (e.g., an actual shelf, section and store), to an entire catalog of products available in a retail system on a regular basis, following and anticipating movement of the display location of items for presentation and display day to day, week to week, etc. throughout a retail network of stores.

2. Background of Related Art

Location information provides customers and store employees with the ability to efficiently keep on top of restocking and merchandizing efforts. However, determining the actual location of any given item, on any given day, within any given store of a large chain is a challenge, particularly given that the exact shelf or floor display locations of items may and do change daily. In fact, even the floor displays themselves may move from day to day, e.g., racks of clothing.

Moreover, in larger retail brands having a number of different stores, local discretion may be implemented in placement of any given item on any given day. Thus, determination of the actual locations of a mass number of retail items on any given day, particularly across many stores within a retail chain, isn't conventionally viable or even possible. Even in the largest retail chains which may have hundreds and sometimes thousands of physical brick-and-mortar store locations, often local, customized merchandizing strategies are often implemented to reflect regional preferences.

Store operators often have diagrams of stores, as well as planograms or other information regarding the location of many products within their stores. However, the information regarding even the intended location of specific products within one or more of the stores is often incomplete or missing. Needless to say, locating a specific item in any given store is hampered by incomplete or missing product location information, for which no locating guidance can be provided.

Moreover, certain types of retail items such as apparel items are more prone to be placed in specific locations within stores without exactly following any relevant detailed planogram. Placement of individual items of apparel and such in many stores is often left to the discretion of local department and floor managers, rather than being scripted in advance.

Both the employees of the retail stores and their customers want to know exactly where items are located so that they can be found and purchased (in the case of a shopper), or located by an employee to, e.g., hang a sign, restock, reface (organize and cleanup), etc.

Accordingly, when providing direction to an employee restocking shelves, or to a customer looking for a particular item, or to an online fulfillment center who has a list of retail items within the retailers system to procure and ship, determination of the location of all items within a retailer's system (which can be hundreds of thousands of items) is important. All systems are only as efficient as their weakest link, and if the location of a significant percentage of items within a retailer's system are unknown, any operation that requires location of any number of items can fail. Thus, it would be important for a retailer to have the capability to create a database of the items within their retail catalog that includes a location for every item within that catalog.

There is a need for shoppers to find the exact location of given items; otherwise shoppers may not be able to find and buy the item.

There is also a need for store owners to know the exact location of items so as to determine the reasons why a particular item may or may not be selling. For example, despite being a popular item, shoppers have difficulty finding the item in the store.

Moreover, analytics, fine grain location analytics, and A/B testing to improve the square-foot based profitability of a given store would all greatly benefit from more complete and accurate location information. In other words, a fine-grain product location assignment would provide the store with a fine-grain performance analytics.

There is also a need for more accurate and complete location assignment to enable personnel to determine sold-out, missing or misplaced items.

SUMMARY OF THE INVENTION

In accordance with the present invention, a method of building a physical location computer database including assigned location information for items located in a store comprises forming a first memory matrix including a plurality of logical columns each comprising an identity of one of a corresponding plurality of checkout stands in a given store, the first memory matrix further including a plurality of logical rows each associated with the plurality of logical columns, each of the plurality of logical rows corresponding to a location within the store where an item may be located. A second memory matrix including a plurality of logical columns corresponding to the plurality of checkout stands in the given store is formed, the second memory matrix further including a plurality of logical rows each associated with the plurality of logical columns, each of the plurality of logical rows corresponding to an item purchased in the store at the corresponding one of the checkout stands in the intersecting one of the plurality of logical columns. A best fit is performed of the second memory matrix with the first memory matrix to produce a distribution of probable ones of probable locations within the store that the purchased item was located. The distribution of probable ones of probable locations of each purchased item, based on point of sale (POS) transaction data, is ranked with a physical processor. The highest ranked probable location for each item is extracted from the probability memory matrix, and the extracted highest ranked probable location for each of a plurality of items is stored in a logical row in the physical location computer database. In this way, the best fit generates the most probable location of the plurality of items based on transactional data obtained from the plurality of checkout stands, and the highest ranked probable location for each of the plurality of items is assigned as the location of the respective one of the plurality of items.

In accordance with another aspect of the invention, a non-transient computer-readable storage medium having stored thereon instructions that, when executed on a processor, configure the processor to build a physical location computer database including assigned location information for items located in a store, by forming a first memory matrix including a plurality of logical columns each comprising an identity of one of a corresponding plurality of checkout stands in a given store, the first memory matrix further including a plurality of logical rows each associated with the plurality of logical columns, each of the plurality of logical rows corresponding to a location within the store where an item may be located. A second memory matrix including a plurality of logical columns corresponding to the plurality of checkout stands in the given store is formed, the second memory matrix further including a plurality of logical rows each associated with the plurality of logical columns, each of the plurality of logical rows corresponding to an item purchased in the store at the corresponding one of the checkout stands in the intersecting one of the plurality of logical columns. A best fit is performed of the second memory matrix with the first memory matrix to produce a distribution of probable ones of probable locations within the store that the purchased item was located. The distribution of probable ones of probable locations of each purchased item, based on point of sale (POS) transactional data, is ranked with a physical processor. A highest ranked probable location for each item is extracted from the probability memory matrix. The extracted highest ranked probable location for each of a plurality of items is stored in a logical row in the physical location computer database. In this way the best fit generates the most probable location of the plurality of items based on transactional data obtained from the plurality of checkout stands, and the highest ranked probable location for each of the plurality of items is assigned as the location of the respective one of the plurality of items.

BRIEF DESCRIPTION OF THE DRAWINGS

Features and advantages of the present invention will become apparent to those skilled in the art from the following description with reference to the drawings, in which:

FIG. 7 shows an exemplary memory matrix B containing columns each representing a different checkout stand, and rows each representing an item (or cluster of items) within the store or venue.

DETAILED DESCRIPTION OF ILLUSTRATIVE EMBODIMENTS

Figure 1:
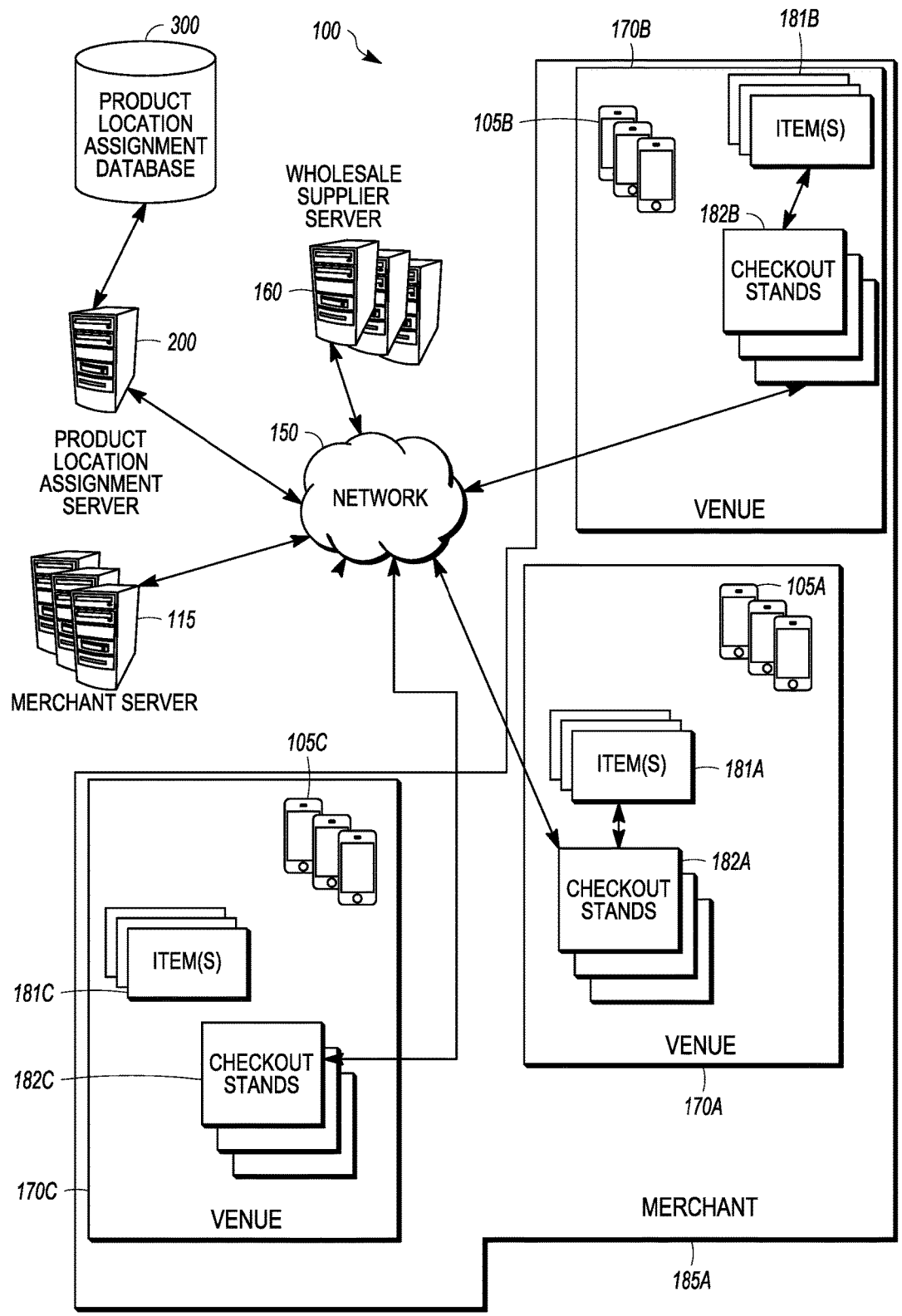
FIG. 1 illustrates an exemplary product location assignment system including a product location assignment server and a product location assignment database, in accordance with the principles of the present invention.

A location assignment system determines location information within a given store for all items or products in a retailer's catalog.

A transaction based location assignment system is provided as a solution to the problem prevalent in many stores about the location of their merchandise. In general, items in the store are misplaced, moved, re-arranged, or simply out of stock, and over time their locations in the store can become unknown. Disclosed embodiments relating to point of sale (POS) transaction based location assignment take advantage of the fact that most department stores deploy distributed checkout stands.

This invention provides a system and method to create a complete and accurate location assignment database in a location assignment system. The invention is primarily applicable for use in department stores where a good number of checkout stands are spread around the store. Some department stores may utilize 70 or even 100 separate point of sale (POS) terminals at numerous checkout stands, though some POS terminals may be clustered together. A premise of the transaction based location assignment system is that shoppers tend to pay for their items at checkout stands that are at or closest to the location within the store of the item being purchased.

The invention uses the physical location of the checkout stands in the store. It also uses product purchase or transaction information from the checkout stands. Using these arrays of information, the transaction based location assignment system provides a most probable, or most likely, location for any item within a given store.

The transaction based location system has the capability to work both for items having a single location in the store, as well as for items with multiple physical locations in the store.

A transaction based location assignment system and method disclosed herein assigns a location to items in a retail product line that otherwise do not include known location information, e.g., from a location audit, such that there is a high probability that the assigned location of a given product is very likely where the product actually is located within a retail network, within a store, within a department, within a defined area, etc.

Generally speaking, it is not practical to have known location information for all items in a store. At best, an occasional audit of the location of some items can provide some known location information, or a check of assigned location information determined via the transaction based location assignment system in accordance with the principles of the present invention.

The inventors hereof have appreciated that there is a need for a system which can determine a location of 100% of products in a retail system—and be able to indicate a new location if transactional data so indicates.

In the absence of known location data, the transaction based location assignment system uses specific rules and algorithms to assign a location for each product in a store to inform about exactly where the item/product most likely is located, and assigning the most likely location to the item by storing location data associated with the item to build an item location database.

The present invention provides a transaction based location assignment system and method which assigns a given location to each product in a retail system. This assignment can detect and accommodate movement of items within the store. Thus, given a complete catalog of every product sold in a given retail store system (which often runs in the tens of thousands or even hundreds of thousands of individual products), the transaction based location assignment system has the capability to assign a location to every product sold. Thus, assigning location to a large percentage of items within a retail catalog of items that do not otherwise have location information enables an efficient and accurate physical search for the given product.

The transaction based location assignment system provides an item location database that greatly simplifies order fulfillment for stores that might also take online and other types of orders for customers. The transaction based location assignment system also helps a shopper, or store employee, locate a given product within a physical retail space. The transaction based location assignment system can also be used to provide a most probable location of product to a stocker in a store, particularly in soft-line retail stores that sell clothing and other soft goods, or to an employee tasked with the chore of hanging the latest day's sales signs, e.g., "buy 2 shirts, get one free". The transaction based location assignment system creates an improved product or item location database for use by a retail employee tasked with physically checking inventory of, e.g., one hundred specified items. Using the improved and more complete item location database, the most efficient route for an employee to traverse in working through those one hundred specified items may also be generated by the transaction based location assignment system.

The transaction based location assignment system can also itself influence the actual placement of items, thus improving the accuracy of the assigned location. For instance, a new item about to be stocked can be located where the location assignment system assigns the location of a cluster of items having at least one similar characteristic to be.

In preferred embodiments, the transaction based location assignment system not only uses statistical information based on point of sale transactions to infer and thus assign a most probable location to products, but in some embodiments also preferably implements machine learning principles to better its location assignment process. For instance, if a product is assigned a given location that is not fully accurate or which can be improved upon, and is improved upon by a manual correction after a location audit, the transaction based location assignment system learns from the basis of that correction to provide better weighting of various factors and probabilities for determining a likely checkout stand used most frequently to purchase the relevant item.

The current embodiments of the invention relate particularly to soft-retail goods. Altitude data can be included by the location assignment system if altitude data is included in the layout of a store (e.g., distinguishing between shelves in a rack). Altitude data is usually provided in terms of a relative altitude. For instance, a shelf may be 24" high. Alternatively, no explicit altitude information may be provided but a plurality of shelves may nevertheless be identified, such as "shelf 1, shelf 2, shelf 3, shelf 4. The location assignment system infers that shelf 2 is above shelf 1, shelf 3 is above shelf 2, etc.

The transaction based location assignment system may in certain embodiments enable the ability to generate a visualization of all catalog products (items) in a retailer's store. The transaction based location assignment system may also include the capability to assign a range of floor space or shelf space given to a product so as to enable generation of visual views. The visual views may be a rack of clothing, a shelf view, or products on shelves of a specific department in a specific store of a retail chain.

The transaction based location assignment system may provide different levels of product location for any given item within the catalog.

The transaction based location assignment system preferably presumes that there are no empty racks or shelves in a given store, out-of-stock situations aside. However, it is within the principles of the present invention to include stock volume in the product location assignment database 300 such that an out-of-stock situation would be reported to someone trying to locate the out-of-stock item.

In assigning location to a given product, the transaction based location assignment system preferably distinguishes between a location from 'known' information such as audit data, and a location assigned as a most probable location based on point of sale (POS) transaction data for that product.

The transaction based location assignment system may define the area of any given department based on its contents. This is particularly important because items of a certain category may be placed in such a way that the departments themselves become defined by their contents.

The transaction based location assignment system preferably assigns segment numbers, etc., based on a distance from checkout stands and/or a distance from an entrance to a store.

The transaction based location assignment system passes product data to a location assignment process. The location assignment process is the process by which location of each item is assigned. The location assignment process utilizes as input transaction information linking purchased items to a checkout register where purchased, and also utilizes known locations of the checkout registers when the purchase occurred. In disclosed embodiments, the transaction information is point of sale (POS) receipts.

Thus, the transaction based location assignment process assigns a product/place (i.e., location) for each input product (item). Some of the assigned locations may be checked against audited location data, and weights used to create a probability matrix may be revised so as to assign a location that more accurately reflects the actual location of an item.

Items that have locations assigned based on the point of sale transactional history of items are referred to herein as soft-assigned item locations. In some embodiments, the items may be tagged within the product location assignment database as having either a location that was assigned by the transaction based location assignment system, or a known location based, e.g., on audited location data.

In some embodiments, the transaction based location assignment system may first process input items having sales above a given threshold. For instance, items having at least 15 point of sale (POS) transaction receipts over a relevant time period. These high-sale items would have their location assigned and stored first in a product location assignment database 300. Probability matrix data is created using the high-sale items. Thereafter, the remainder of items within the retail catalog, i.e., those with fewer than 15 POS receipts over the relevant time period, may be assigned location based on an attribute of the item defined within an item cluster including at least one high-sale item, using the transaction based location assignment system. In this way, a structure is first established whereby items with a better statistical basis are used to create probability matrices, then the lower-sale or non-sale items have their locations assigned based on a match to an item cluster including a given matching criteria.

The transaction based location assignment system also has the capability to detect and accommodate any recent movement of an item from a prior location based on recent point of sale (POS) transaction data.

FIG. 1 illustrates an exemplary transaction based product location assignment system including a product location assignment server 200 and a product location assignment database 300. In communication with the transaction based location assignment system may be one or more merchant servers 115, and one or more wholesale supplier servers 160.

The transaction based product location assignment server 200 may be in communication with a merchant 185 including a single venue 170A, or that includes a plurality of separate venues 170A, 170B, 170C. The venues 170A, 170B, 170C each include a plurality of point-of-sale terminal checkout stands 182A, 182B, 182C that each provide point of sale (POS) transaction information relating to a respective catalog of items 181A, 181B, 181C available in the respective store (venue) 170A, 170B, 170C. Mobile devices 105A, 105B, 105C may be used as mobile payment devices by customers at the POS checkout stands 182A, 182B, 182C to complete sale transactions of particular items 181C. Of course, other traditional payment methods may also be used, e.g., a credit card, debit card, cash, etc. Each POS checkout stand 182A within a given venue 170A preferably provides transactional receipt data for each purchase made to an appropriate merchant server 115 via a network 150. In accordance with the invention, the transactional receipt data is either directly or indirectly forwarded to a product location assignment server 200, which includes the transaction based location assignment system in accordance with the principles of the present invention.

The product location assignment server 200 or the merchant server 115 may filter the POS transaction receipt data as desired, e.g., to purchases made during the most recent day, week, month, quarter, year, etc. The POS transaction receipt data may also be filtered by time of day (e.g., between 5 pm and 9 pm local time), etc. Ideally, the POS transaction receipt data is filtered to provide a most accurate reflection of a time in a given venue when it is most likely that checkout stands closest to a purchased item will be utilized most frequently. For example, during rush times when movement about the store may be more difficult.

RFID or other location tracker or beacon devices may be associated with some of the retailer's catalog items 181A, 181B, 181C as a source of audit location data.

FIG. 1 depicts a merchant 185 having a plurality of venues 170A, 170B, 170C thus disclosing that the present invention relates equally to transaction based location assignment for item catalogs relating to larger retail merchants having a plurality of venues 170A, 170B, 170C. In disclosed embodiments, each venue 170A, 170B, 170C has its own layout, its own point of sale (POS) transactional data, its own uniquely identified checkout stands, etc. Of course, it is within the scope of the invention for a retail system having a number of stores with nearly identical floor plans and nearly identical planograms to utilize POS transaction data from any of their similar stores as input to the transaction based location assignment system for any other of their similar store.

The CAD floor plan(s) 12 in some embodiments divide the venues 170A, 170B in the y-coordinate by aisles, rows and the like, and may be associated with a size of the aisle, row, or the like (such as, for example, 7'-7"). The CAD floor plan(s) 12 of the venues 170A, 170B in these embodiments are divided in the x-coordinate by bay, section, shelving units, and the like. Some sections may occupy an entire row (a y-coordinate unit), or a portion of a row (an x-coordinate within a y-coordinate unit). The CAD floor plan(s) 12 of the venues 170A, 170B further comprise z-values for layers of shelves, shelf sections, or the like, and/or such z values may be represented by additional layers in CAD floor plan(s) 12. Components of the CAD floor plan(s) 12 which describe the occupation of space such as rectangular units, areas, points, anchor points (which may indicate the starting point for measuring a distance), dimensions, identification of aisles, sections or bays and the like shall be referred to herein as "spatial units." The spatial units in the CAD floor plan(s) 12 may correspond to standard units, such as a 2' or 4' lengths, 2' by 4' rectangles, and the like or may have non-standard defined dimensions.

The association between the map labels and the spatial units is according to a file which is part of, accompanies, or is associated with the CAD floor plans 12, which is created with the creation of the CAD floor plans 12 or created after the fact, programmatically, and/or with human assistance.

Item unique identifier(s) such as a SKU, UPC, or product name or number, a barcode or the like, are preferably used to identify items.

An error radius for an assigned location may be set, and used to identify an uncertainty in the location assigned to an item. The error radius or perimeter is preferably relative to the determined location (or relative to a center of a determined location). The error radius may be a circular radius, a non-circular area such as a rectangular area within an aisle (as may fit within a circular radius, factoring in the shape of the venue and utilization of spatial units such as aisles), or the like.

Blocks enclosing the merchant 185 with venues 170A, 170B, 170C are logical blocks, not necessarily indicating physical boundaries. Venues 170A, 170B, 170C may be buildings, such as stores comprising merchandise items for sale, at multiple distinct geographic locations. POS terminal checkout stands 182A, 182B, 182C may be, for example, cash registers, checkout stands, clusters of the same, or equivalent devices capable of facilitating the completion of a transaction to purchase an item. Moreover, while the disclosed embodiments relate to POS terminal checkout stands 182A, 182B, 182C being at fixed locations within the store, the present invention relates equally to the use of a mobile POS terminal checkout stands so long as the POS transactional data includes a location of the mobile POS terminal checkout stand at the time of purchase, or information sufficient to determine a location of the mobile POS terminal checkout stand at the time of a given POS transaction.

Mobile payment devices 105A, 105B, 105C may be, for example, mobile phones, smart phones, tablet computers, laptop computers, or the like. The merchant server 115 and wholesale supplier server 160 may be, for example, computers utilized by merchants, and suppliers to merchants, respectively.

Connection to the network 150 shown in FIG. 1, or direct connection between computing devices, may require that the computers execute software routines which enable, for example, the seven layers of the Open System Interconnection (OSI) model of computer networking or equivalent in a wireless phone or wireless data network. The network 150 comprises computers, network connections among the computers, and software routines to enable communication between the computers over the network connections. The network 150 may comprise, for example, an Ethernet network and/or the Internet. Communication among the various computers and routines may utilize various data transmission standards and protocols such as, for example, the application protocol HTTP. Transmitted data may encode documents, files, and data in various formats such as, for example, HTML, XML, flat files, and JavaScript Object Notation (JSON).

While components may be discussed herein as connecting to the product location assignment server 200 or to the product location assignment database 300, it should be understood that such connections may be to, through, or via the other of the two components. References herein to "database" should be understood as equivalent to "datastore". The merchant server 115, the wholesale supplier server 160, the POS terminal checkout stands 182A, 182B, 182C, and the mobile payment devices 105 may comprise a database. Although illustrated in the figures as components integrated in one physical unit, the computers, servers and databases may be provided by common, separate, or distributed physical hardware and common (or separate) logic processors and memory components.

Figure 2:
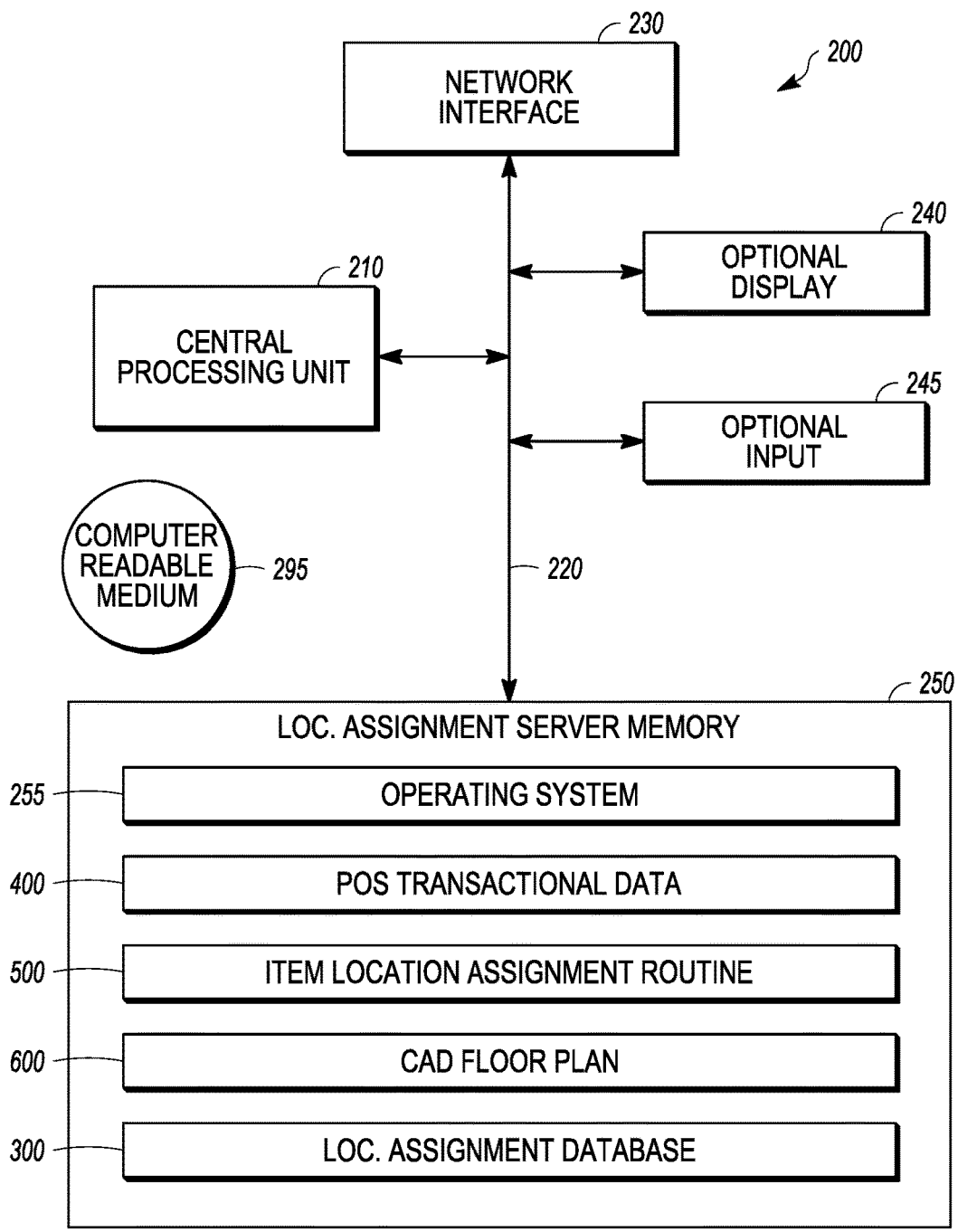
FIG. 2 is a functional block diagram of an exemplary product location assignment server computing device and some data structures and/or components thereof.

FIG. 2 is a functional block diagram of an exemplary transaction based product location assignment server 200 and relevant data structures and/or components thereof. The transaction based product location assignment server 200 comprises at least one CPU processing unit 210, location assignment server memory 250, an optional display 240, an optional input device 245 (e.g., keyboard), and a network interface 230, all interconnected via a bus 220. The network interface 230 may be, e.g., an Ethernet interface, and may be utilized to form connections with the network 150 (FIG. 1). The network interface 230 may be wired and/or wireless.

A DVD, USB thumb drive, or other computer readable medium 295 may preferably be used by the transaction based product location assignment server 200 via a suitable interface (e.g., a DVD player, or a USB interface, respectively). The POS transaction receipt data may be input to the transaction based product location assignment server 200 via the network 150, or via the computer readable medium 295 or other appropriate data input device such that potential mediums to hold POS data include a DVD, CD-ROM, memory card, or USB thumb drive.

The location assignment server memory 250 generally comprises a random access memory ("RAM") such as SDRAM (synchronous dynamic random-access memory) and/or a permanent mass storage device, such as a disk drive. The location assignment server memory 250 stores program code for software routines, as well as browser, webserver, email client and server routines, camera, other client applications, and database applications. In addition, the location assignment server memory 250 also stores an operating system 255. Software components may be loaded from the non-transient computer readable storage medium 295 into the location assignment server memory 250 using a drive mechanism (not shown) associated with a non-transient computer readable storage medium 295, such as a DVD/CD-ROM drive, memory card reader, USB bus, etc. In some embodiments, software components may also or instead be loaded via a mechanism other than a drive mechanism and a computer readable storage medium 295, e.g., via the network interface 230.

The input 245 of the transaction based location assignment system 200 may comprise hardware supported input modalities such as, for example, a touchscreen, a keyboard, a mouse, a trackball, a stylus, a microphone, an accelerometer(s), a compass(es), RF receivers (to the extent not part of the network interface 230), and/or a camera.

Figure 3:
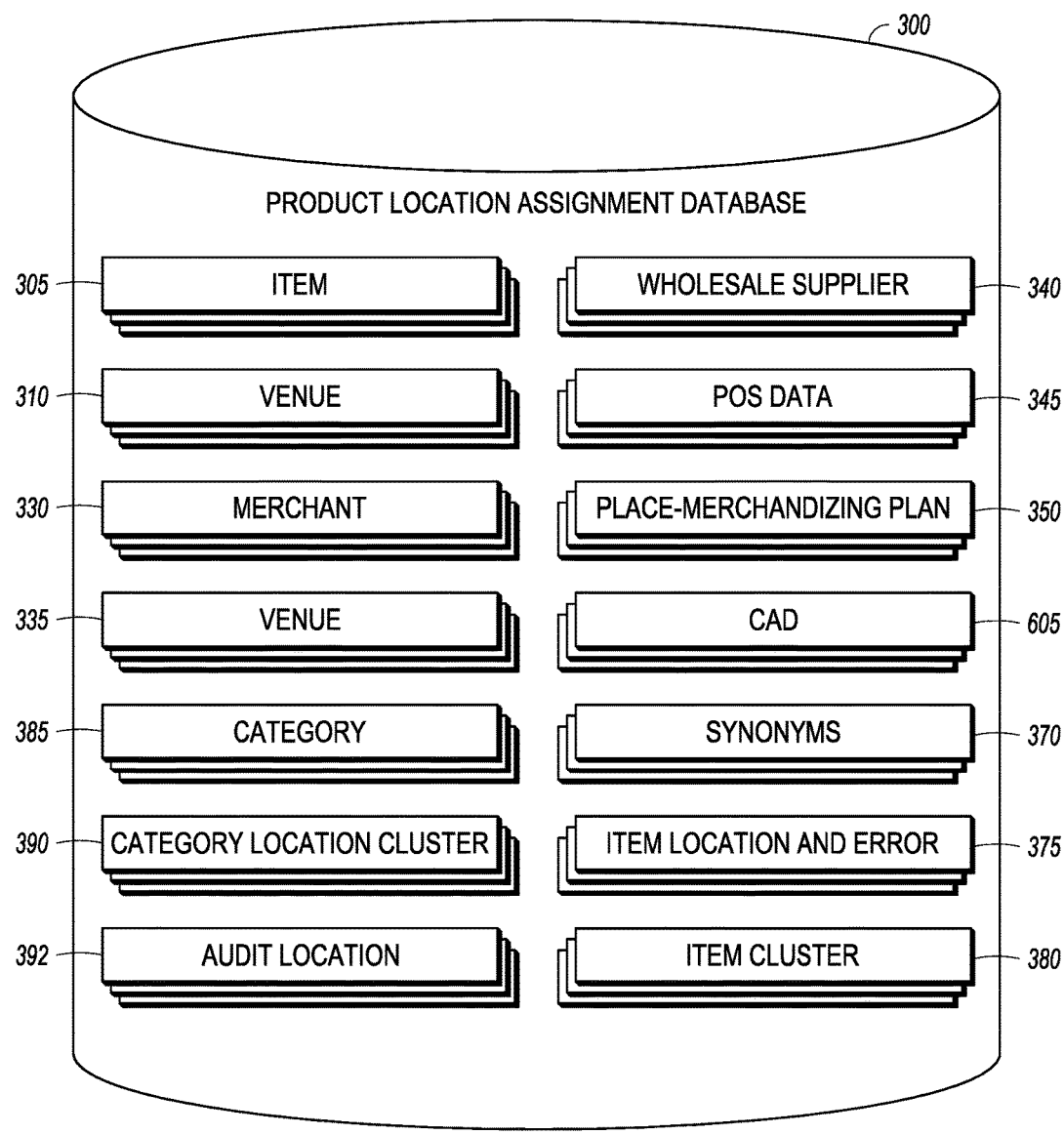
FIG. 3 is a functional block diagram of an exemplary product location assignment database, in accordance with the principles of the present invention.

The transaction based location assignment system 200 may comprise, or communicate with via the bus 220, the product location assignment server database 300, illustrated in detail in FIG. 3. In some embodiments, the transaction based location assignment server 200 may communicate with the product location assignment server database 300 via the network interface 230. The transaction based location assignment server 200 may, in some embodiments, include many more components than those shown.

Referring again to FIG. 2, the transaction based location assignment server 200 may comprise various data groups and control routines, which are discussed at greater length herein. Webserver and browser routines may provide an interface for interacting with the other computing devices illustrated in FIG. 1, such as with the merchant server 115, the wholesale supplier server 160, and even in other embodiments indirectly with the mobile payment devices 105, (all which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 3 is a functional block diagram of an exemplary product location assignment database 300 including data utilized and created by the transaction based location assignment system 200, in accordance with the principles of the present invention.

In particular, a primary purpose of the transaction based location assignment system 200 is to create a reliable and complete database including a location of every item in a retailer's product line or catalog. In some embodiments, the transaction based location assignment system 200 first assigns location for high-sale items based on point of sale (POS) transaction receipt data tying purchases of those high-sale items to checkout stands with a known location at the time of purchase. Thereafter, the transaction based location assignment system assigns location for the remaining items in a given venue/store based on the use of "item clusters", which utilize a match of an attribute of the item being assigned to an attribute of a high-sale item. This will be described in more detail below.

Thus, the transaction based location assignment system 200 assigns a location to each item using point of sale (POS) transaction data. The transaction based location assignment system 200 in accordance with the principles of the present invention builds an improved, useful and complete product location assignment database 300 including location for all items in a given store.

In addition to the data groups explicitly illustrated in FIG. 3, additional data groups may also be present on and/or executed by the transaction based location assignment system 200. Moreover, routines for databases, webservers, and web browsers, and routines enable communication with other computers. The data groups used by routines may be represented by a cell in a column or a value separated from other values in a defined structure in a digital document or file. Though referred to herein as individual records or entries, the records may comprise more than one database entry. The database entries may represent, or encode numbers, numerical operators, binary values, logical values, text, string operators, joins, conditional logic, tests, and similar. The browser routines may provide an interface for interacting with other computers through, for example, a webserver routine (which may serve data and information in the form of webpages). The web browsers and webservers are meant to illustrate or refer to user-interface and user-interface enabling routines generally, and may be replaced by equivalent routines for serving and rendering information to and in a user or device interface. Log-in credentials and local instances of user or device profiles may be stored in or be accessible to the transaction based location assignment server 200, the merchant server 115, and/or the wholesale supplier server 160. User or device profiles may be utilized to provide secure communication between computers.

The software routines, as well as data groups used by the software routines, may be stored and/or executed remotely relative to any of the computers.

The components of the product location assignment database 300 are data groups used by routines and are discussed further herein. Though referred to herein as individual records or entries, the records may comprise more than one database entry. The database entries may be, represent, or encode numbers, numerical operators, binary values, logical values, text, string operators, joins, conditional logic, tests, and similar. In addition to the data groups used by routines, log-in credentials and local instances of customer and user profiles may be stored in or be accessible to all of the computing devices illustrated in FIG. 1.

The present inventors have recognized that items in a store or venue are of course located or displayed at a given location (e.g., on a given rack, or folded on a shelf in a given fixture within the store or venue). The inventors have also appreciated that in larger department stores, checkout stands are typically distributed throughout the store, e.g., with one checkout stand, or a cluster of checkout stands, within each department. The present invention makes use of the relationship between the location of items in a store and the need to present the same at a checkout stand to complete a purchase.

The inventors have appreciated that statistically speaking, any given item will be purchased at any number of checkout stands, with a given probability related to physical aspects (e.g., distance) between the item and the checkout stand. Thus, a given item will be purchased most frequently at POS terminal checkout stands that are closest to the location in the store where the item was displayed, and with less frequency at POS terminal checkout stands that are farther away.

Figure 4:
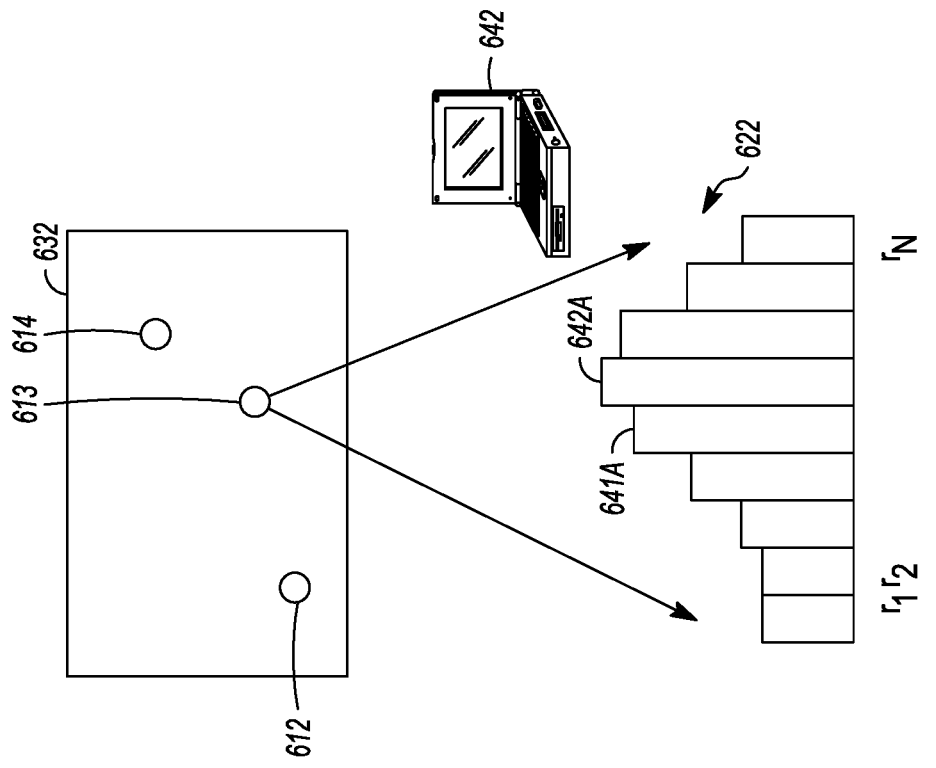
FIG. 4 is a depiction of the distribution of checkout registers (point of sale terminals) used to purchase a given item located at a given location within a given store.
Figure 4:
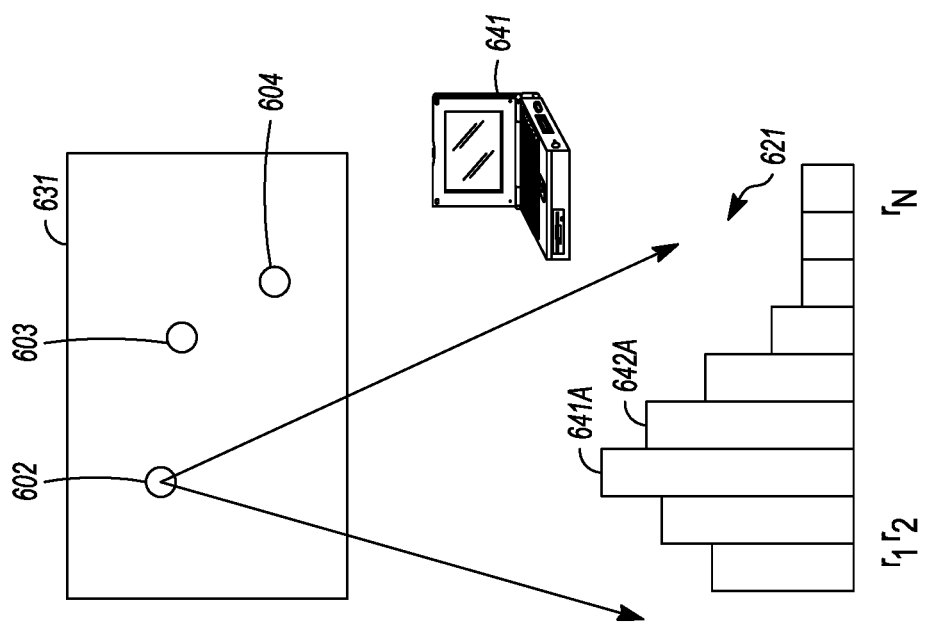

FIG. 4 depicts the distribution of use of the different POS terminal checkout stands ($r_1, r_2, \ldots r_n$) within a store or venue for purchase of any given item. In particular, FIG. 4 is a depiction of the distribution of use of two particular point of sale terminal checkout stands (registers) 641, 642 used to purchase given items 602, 603, 604, 612, 613, 614 available for purchase while displayed at respective locations within a given store.

Statistically speaking, any of items 602, 603 or 604 located in a first department 631 will be purchased most frequently at a register 641 which is located closest to the department 631. Of course items will be carried by some customers to other, more distant POS terminal checkout stands, but with a sufficient number of POS transactions including items 602, 603 or 604, a statistically stable probability will emerge that indicates a greatest probability that items 602, 603 and 604 will be purchased most frequently at checkout stand 641.

Probability chart 621 indicates a number of purchases of a given item 602 at registers $r_1, r_2, \ldots r_n$ within a relevant department store. As depicted, the checkout stand 641 that is physically closest to the location of display of the item 602 within the store results in the highest probability 641a in the probability chart 621.

Note that a nearby checkout stand 642 would indicate a statistically significant probability of being used to purchase that same item 602, albeit a lower probability than the closer checkout stand 641 with probability 641a.

Probability chart 622 indicates a number of purchases of a different item 613 from a different department 632. In this case, the checkout stand 642 is closer to the item 613 within the store, and thus, statistically speaking, shows the highest probability 642a in the probability chart 622 of being purchased at checkout stand 642. Nearby checkout stand 641 has a significant probability 641a of being used to purchase item 613, but not as high as that of checkout stand 642 for item 613.

In an ideal world, if the location of all items to be purchased within a store was known, then a memory matrix A could be created that would accurately detail the probability distribution of each checkout stand being used to purchase each item obtained from a known location within the store based on predetermined weighted criteria such as distance to checkout stand and other factors. Thus, as a theoretical example, a memory matrix A would contain a column for each checkout stand within a store or venue, and a row for each location that any item can be displayed or located within the store or venue. Statistically, a customer will purchase any given item most frequently at a checkout stand closest to where the item was located.

However, we do not live in an ideal world, and the locations of all items within a store or venue are not known a priori.

Figure 5:
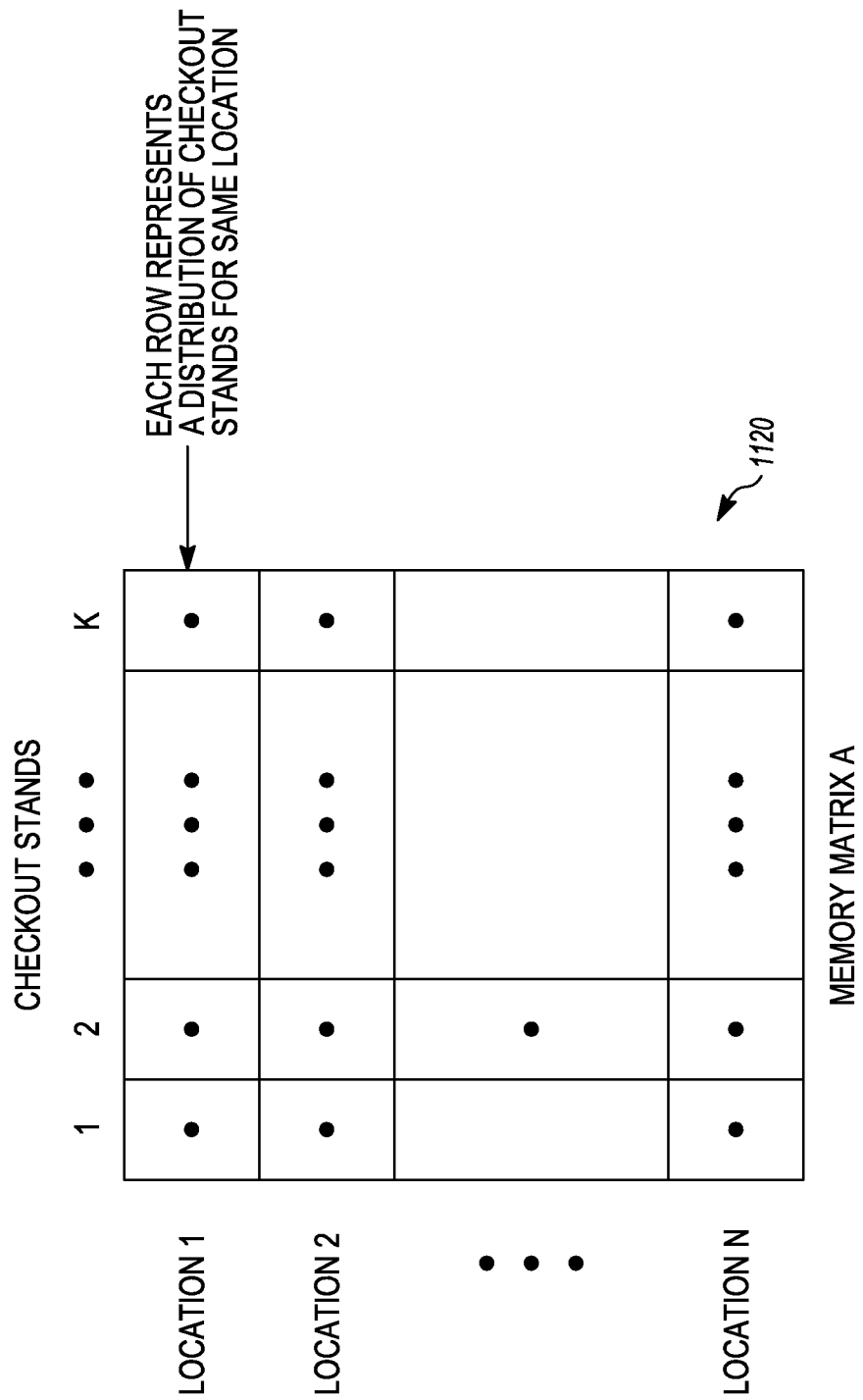
FIG. 5 shows a memory matrix a relating columns each representing a checkout stand within a given store or venue, to rows each representing a possible location within the given store for items to be placed.

FIG. 5 shows a memory matrix A relating columns each representing a checkout stand within a given store or venue, to rows each representing a possible location within the given store for items to be placed.

Since we do not know the actual physical locations of the items in the store or venue beforehand, we estimate (approximate) the matrix A, (referred to as matrix $A_e$), based on factors that would increase or decrease the chance that any given item will be checked out through any given checkout stand.

$$A_e \approx A$$

Exemplary factors used in disclosed embodiments of building the matrix $A_e$ include:
a) a distance between each possible item location, and each possible checkout stand,
b) a visibility of any given checkout stand from any possible item location, and
c) a match of an item attribute such as 'selling department' associated with any given item, and that same item attribute in other items, to form 'item clusters' including all possible locations for items with that same item attribute (e.g., 'selling department'.

Of course, weighting and configurations are dependent on characteristics of the individual stores. While these specific factors were weighted and utilized in disclosed embodiments, other factors are possible and contemplated within the principles of the present invention. For instance, foot traffic may be weighted and utilized to increase or decrease a probability that any given item will be checked out through any given checkout stand.

Moreover, each of the disclosed specific factors may be implemented in various ways. For instance, a distance between each possible item location and each possible checkout stand may be a linear distance as the "crow flies", or more preferably the distance may be a route distance (i.e., the length of the shortest path a customer could take to walk from the location of the item to the given checkout stand).

Visibility relates to a presumed line of sight between the location of the item and the given checkout stand. A checkout stand visible from a given location will have a much higher probability of use to purchase an item obtained from that given location than a checkout stand that is not visible from the given location. Or if there is a physical wall between the checkout stand and a given item, the probability that that checkout stand would be used to purchase the item on the other side of the physical wall would be diminished, particularly if another checkout stand is visible from the location of the item.

While disclosed embodiments relate to checkout stands that have a known location within the store, the principles of the present invention relate equally to a mobile checkout stand, albeit with the additional requirement in such embodiment to ascertain the location of the mobile checkout stand within the store when the items were purchased.

In accordance with the present invention, the 'location' relates to the physical place within the store or venue where the item is located or displayed for purchase. Point of sale (POS) transactional data is presumed to include an identity of an item or items purchased, an identity of the particular checkout stand used for that purchase, and various other POS transactional data such as time purchased, date purchased.

Location-to-Checkout Stand Memory Matrix A

'Location' here may be referred to as a store_location_id that refers to a subset area within the store, for example, a shelf-location, a location of a clothing rack or fixture, or just a polygon shape area within a selling-department where merchandise can be placed for sale. In a general sense, 'location' is defined as a shape of area in the store that is smaller than a department. In disclosed embodiments the location may be a geographic area within the store of 3 feet by 3 feet.

Each 'checkout stand' may be referred to as a checkout_stand_id that also has a physical location associated with it. In disclosed embodiments each checkout stand is marked with a unique label. In a general sense, the 'checkout stand' is either a single POS terminal (cash-register) or a cluster of two, three or four (or more) POS terminals arranged in very close proximity to each other. Location of the checkout stand can be temporary or permanent so as to accommodate a mobile environment, e.g., use of a mobile device such as a mobile phone or smart phone for checkout, or use of a mobile handheld scanner device provided by the retailer for use within the store.

Figure 8:
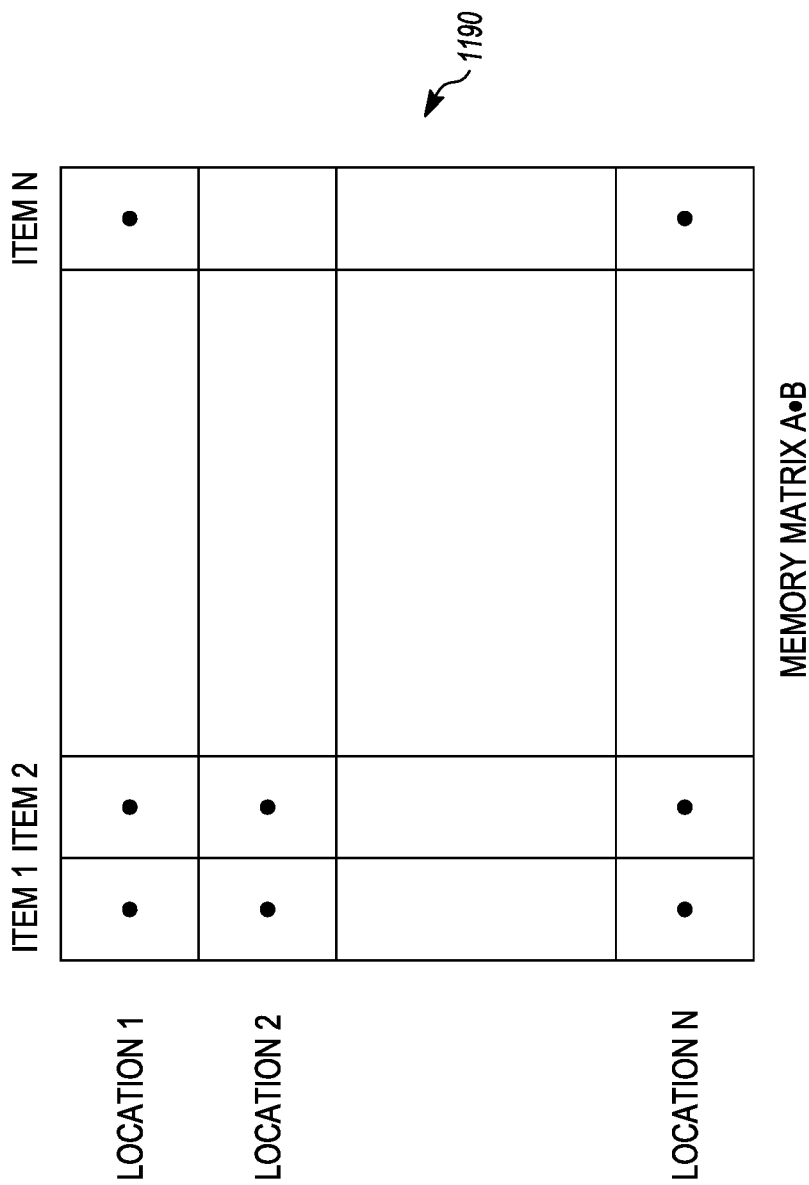
FIG. 8 shows the dot product result of memory matrix A and memory matrix B.

The 'items' as shown in FIGS. 7-8 is a value representing the number of the given item purchased at the given checkout stand, e.g., a quantity overall, a percentage of all sales, etc. Moreover, 'items' as used herein may refer to individual items in a product catalog (item_ids), or can alternatively refer to clusters of items having at least one common attribute (item_group_ids).

The values of the location-to-checkout stand memory matrix A shown in FIG. 5 represent the probability (or likelihood) that a product from physical_location_i in the store is purchased at checkout_stand_j. This probability is calculated as the function of the distance between physical_location_i and checkout_stand_j, and may be adjusted by other weighted factors. This probability may also be adjusted based on location audit data which provides a machine learning mechanism for the location-to-checkout stand memory matrix A.

The distance between the physical locations in a store and each of the checkout stands may be calculated in a number of ways. For example, the distance may be:
a linear distance "as the crow flies" between physical_location_i in the store and checkout_stand_j,
a designated pathway or route distance in the store between physical_location_i and checkout_stand_j, or
distances of soft-paths, when the path goes between the fixtures of a department.

The distance may also be a weighted combination of the multiple types of distance.

Thus, the invention leverages the realization that the probability of an item from physical_location_i being purchased at checkout_stand_j is a function of the distance between the physical_location_i and checkout_stand_j. This probability is inversely proportional to the distance. In other words, the farther away physical_location_i is from checkout_stand_j, the less likely it is that a customer will purchase a given product obtained from physical_location_i at checkout_stand_j.

Additional factors may be implemented in expanded embodiments of the invention to adjust and fine tune the probability distribution among checkout stands. For instance:
A weighting may be applied based on the proximity of each checkout stand to an entrance or exit of the store (particularly to an exit);
A weighting may be applied based on the visibility of the checkout stand from each location;
A weighting may be applied to accommodate limited accessibility of some checkout stands, e.g., those located in a corner of the store;
A weighting may be applied to accommodate different types of locations in the store. For example, in the stores of one large retail chain the locations may be Type_A (premium), Type_B (average), Type_C (not good) locations.

These weightings preferably become parameters in the functional value of distance between physical_location_i and checkout_stand_j to create an expected probability of an item from physical_location_i being paid for at checkout_stand_j.

Normally distributions derived from point of sale (POS) transaction receipt data would be used, but since the location for items is not known, the matrix is estimated using the methods and heuristics described above and below.

Thus, in a general sense, the probability of location l given the checkout stand k could be represented by:

$$\text{Prob}(location_l \mid checkout_k) = f(d_{kl}, v_{kl}, s_{kl})$$
$$= \frac{1}{(d_{kl} + M)^2} \cdot \phi(s_{kl}, v_{kl})$$

$d_{kl}$ denotes the distance between location l and the checkout-stand k, $v_{kl}$ denotes the visibility from location l to the checkout-stand k, $s_{kl}$ denotes binary input as to whether location l and the checkout-stand k are in the same selling_department, where M is a fixed number, e.g., M=10 and $\phi$ is a boosting function that will assign higher value if checkout-stand k is visible from location l and if they are in the same selling department.

Figure 6:
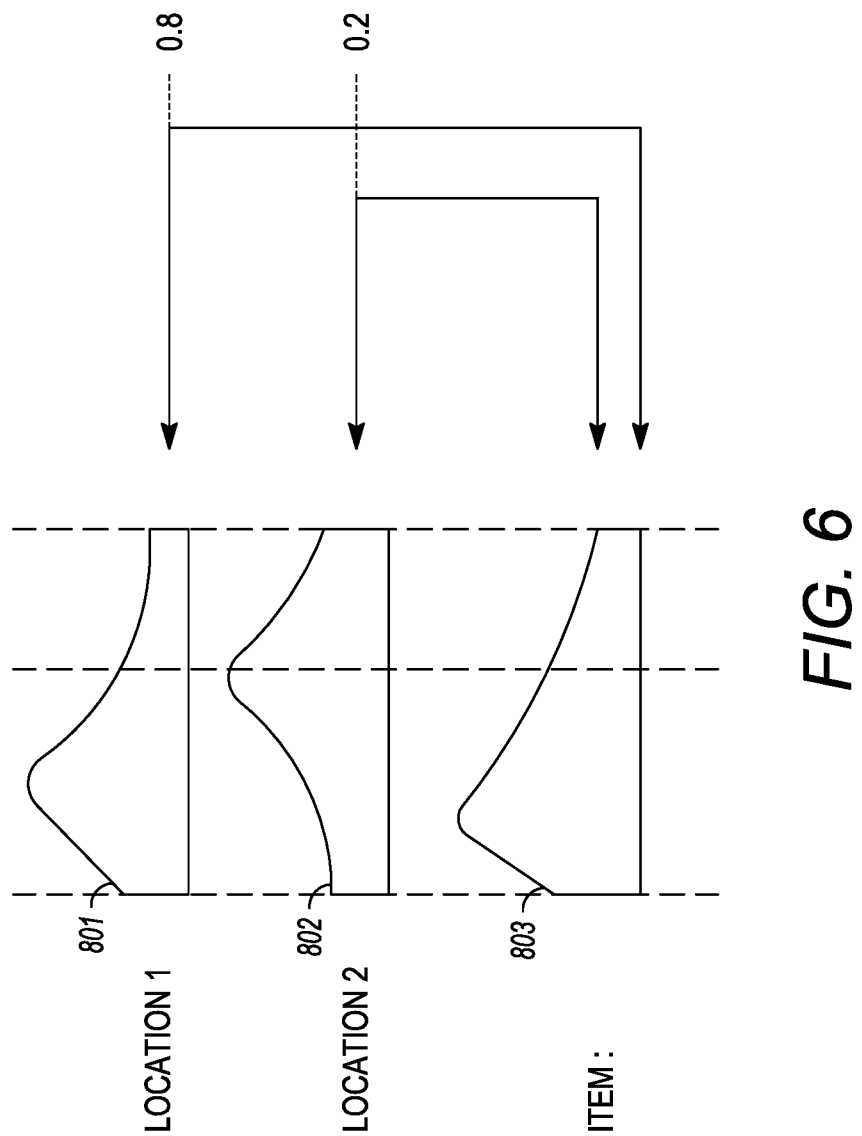
FIG. 6 depicts a distribution of checkout stands used to purchase a given item.

FIG. 6 depicts an exemplary distribution of checkout stands used to purchase a given item.

In particular, as shown in FIG. 6, a first given location within the relevant store has an expected distribution of use of checkout stands as shown in distribution 801, and a second given location within the relevant store has an expected distribution of use of checkout stands as shown in distribution 802. Point of sale (POS) transactional receipt data for a purchased item over a given time results in checkout stand use as shown in distribution 803.

In accordance with the principles of the present invention, a best fit analysis is performed between the POS transactional data distribution 803, and all possible location expected distributions 801-802, and a location having a best fit is assigned as the probable location for that purchased item.

According to the invention, a distribution of the items purchased across the various checkout stands within the store or venue is created from POS transaction receipt data. The distribution is then matched to expected distributions from each location within the store, and the location within the store having the best fit to the distribution created from the POS transaction receipt data is assigned as the location for the relevant item.

For instance, as depicted in FIG. 6, distribution 801 has a fit of 0.8 to the distribution from POS transaction receipt data, whereas the distribution 802 has a fit of 0.2. Thus, among all possible distributions 801-802, distribution 801 has the best fit to the distribution from POS transaction receipt data, and thus the location associated with the expected distribution 801 is assigned as the location of the relevant item.

In another embodiment of determining a most probable location of a given purchased item from point of sale (POS) transactional data, a triangulation may be performed between three or more checkout stands exhibiting the highest use for a given purchased product, using a number of uses, or percentage of use, of each checkout stand as a 'strength' vector representing a distance between the location of the item and the location of the relevant checkout stand.

In disclosed embodiments, distribution plots of checkout stand use are shown with respect to a given ordering of the columns of memory matrix A representing individual checkout stands. While shown in figures in an ordering that presumes adjacency between sequential checkout stands, the present invention relates equally to any ordering of the checkout stand columns in memory matrix A.

FIG. 7 shows an exemplary memory matrix B containing columns each representing a different checkout stand, and rows each representing an item (or cluster of items based on a common attribute) within the store or venue.

In particular, in disclosed embodiments dot product between memory matrix A and memory matrix B is used to find the location having the best fit to the relevant items. However, while the dot product use is shown, the best fit may be determined using other techniques such as a chi square test.

Using point of sale (POS) transaction receipt data, Matrix B is built relating a distribution (number of purchases) across all checkout stands for each item within the store or venue. Each row in FIG. 7 represents a distribution of use of checkout stands for one item, with all items in the store being identified down each column.

While memory matrix A and memory matrix B are shown with columns and rows specifically defined, a person of ordinary skill in the art will recognize that the memory matrixes A and B may be transposed, in accordance with the principles of the present invention.

Checkout Stand-to-Item Memory Matrix B

Values in the checkout stand-to-item memory matrix B represent the probability (or likelihood) that an item (item_j) is purchased at checkout_stand_i (or register-cluster_i). This probability is calculated as a function of the number of times that item_j was purchased at checkout_stand_i within a given set of point of sale (POS) transactional data. The POS transaction receipt data may be filtered to certain days, to certain times of the day, etc., so as to provide a best representation of items being purchased at the nearest checkout stands.

The checkout stand-to-item memory matrix B is constructed from the POS transaction receipt data of the relevant store (commonly referred to as point of sale (POS) data). Values in the checkout stand-to-item memory matrix B are a function of directly proportional with the number of times item_i is purchased at checkout_register_cluster_i, inversely proportional with how often checkout_register_cluster_i was open during business hours, inversely proportional with the number of actual checkout stands in the cluster, inversely proportional with a diversity of the POS transaction receipt, etc.

Additional factors will influence this probability. For instance, a weighting or other accommodation in the probability may be implemented relating to 'returned merchandise' data for each checkout stand.

A weighting or other accommodation in the probability may be implemented relating to a recency of the purchase of the item. That is, how long ago was the purchase in the POS transaction receipt data (e.g., today, yesterday, last week, last month, half a year ago, over a year ago, etc.). Recency information can be used to fade the influence of old purchases. For example, if the item moved over time, to better detect movement of the item fading of old POS transaction receipt data places more emphasis on the new location than on the fading POS transaction receipt data based on an old location for the item.

A weighting or other accommodation in the probability may be implemented relating to a diversity of items purchased together in the POS transaction receipt data, i.e., shopping basket diversity. For instance, if the checkout was for a single item at the checkout-stand then no weighting is applied to the probability based on shopping basket diversity. On the other hand, if the item was purchased together with other items that are from very different departments, or known to be from very distant departments, it can be assumed that that purchase will most likely not be indicative of a location of the item and thus the POS transaction receipt data for that purchase may be faded (or even eliminated) with appropriate weighting so that its influence on the determination of a location of the item is minimized.

A weighting or other accommodation in the probability may be implemented relating to whether or not the checkout-stand was open when the POS transaction was recorded. That is, could customers have used certain checkout stands to purchase an item, or were certain checkout stands closed at times and only opened for example during the peak hours of the store. That is, customers could not use that register for purchases part of the time because it was closed. In such case, preferably the POS transaction receipt data is filtered to times when all checkout stands are available for use by the customer.

A weighted bias or other accommodation in the probability may be implemented relating to the capacity of the checkout stands. For example, some checkout stands might contain a single register for checkout while other checkout stands might contain four (or more) POS terminal checkout stands capable of checking out up to four customers simultaneously.

Thus, in a general sense, the probability of checkout stand k given the item i could be represented by:

$$\text{Prob}(\text{register}_k | \text{item}_i) = f_{ij}(N, n_{ij}, n_k, d_j)$$

where
N: denotes the total number of receipts,
$n_{ij}$: denotes the number of each item i on each receipt j,
$n_k$: denotes the number of receipts checked out in the k-th checkout stand,
$d_j$: denotes the diversity defined by the number of unique combination of "dept_nbr" and "category" on the receipt j, in the other words:

$$d_1 = \#(\text{dept}, \text{category})$$

which shows how many different types of items there are on each POS transaction receipt; the more different the departments and categories are for items on a given POS transaction receipt, the more diverse the POS transaction is.

For example, the exemplary working equation used here to calculate each value of the matrix is:

$$\text{Prob\_B\_ij} = \frac{\alpha \sum_{\text{all item}_j \text{ at checkout}_i} \frac{\log(\text{quantity-of-item}_j) + 1}{\text{diversity-of-receipt-of-item}_j}}{\beta \frac{\text{total-number-of-receipts}}{\text{number-of-receipts-at-checkout-stand}_i}}$$

where
quantity-of-item_j is the number of the same item purchased together on the same receipt by the same shopper,
diversity-of-receipt-of-item_j is defined as the number of different items on the same receipt of item_j that differs from item_j in terms of item-type and item-department, and $\alpha$ and $\beta$ are tuning parameters for tuning the accuracy of the product location assignment using machine learning techniques.

A different method of determining the probability that item_i is purchased at checkout stand_k is found in another embodiment. For example:

$$\text{Prob}(\text{register}_k | \text{item}_i) = \text{const} \cdot \log \left( \sum_{j=1}^{N} \frac{n_{ij}}{\frac{n_k}{500} d_j} \right) I_{\{\sum_j n_{ij} < \lambda\}}$$

where $I_{\{\sum_j n_{ij} < \lambda\}}$ set a threshold of a minimum number of POS transaction receipts for each item used to create the memory matrix B. In other words, if $\Sigma_j n_{ij} < \lambda$, then there are not enough samples to suitably estimate the conditional probability Prob ($\text{register}_k | \text{item}_i$).

The formula $$g_j = \frac{n_{ij}}{\frac{n_k}{500} d_j}$$

shows the prediction power of the item i to the k-th checkout stand for each POS transaction receipt j. Summing up all receipts $\Sigma_{j=1}^{N} g_j$ leads to the likelihood score that item i is assigned to k-th checkout stand.

FIG. 8 shows the dot product result of memory matrix A and memory matrix B resulting in columns representing items (or item clusters), and rows representing locations within the store. Mathematically, memory matrix AB is the result of multiplying memory matrix A with the transposed memory matrix B.

In particular, as shown in FIG. 8, fit scores between items (or item clusters) and locations $A \cdot B^T$ is determined by:

$$A \cdot B^T \approx A_e \cdot B^T$$

Thus what results is a matrix containing a value representing a probability that any given item (1, 2, ... m) is located within the store at any given location (1, 2, ... N). For each given item, the transaction based location assignment system in accordance with the invention assigns the location in the resulting matrix having the highest probability.

Given that all items may not be purchased within a certain period of time, or a statistically small number of certain items may not have sufficient POS transaction receipt data, the present invention may be expanded in other embodiments to identify item clusters instead of individual items. Thus, items may be grouped into a cluster based on a common attribute or similar characteristic features (e.g., items having the same brand, items of the same type product, etc.)

Alternatively, the present invention may be expanded in other embodiments to first assign location to high-sale items, then in a second, fallback to then assign location to items that may not have sufficient POS transaction receipt data (e.g., fewer than 15 POS transaction receipts) using item clusters instead of individual items in the memory matrix B. Items may be grouped into item clusters based on a common attribute or similar characteristic features (e.g., items having the same brand, items of the same type product, etc.)

Accordingly, POS location assignment in accordance with the present invention creates a location-to-checkout stand matrix (memory matrix A), and a checkout stand-to-item purchased matrix (memory matrix B), which are used to produce (via Dot product in the disclosed embodiments) a location probability memory matrix A·B.

Figure 9:
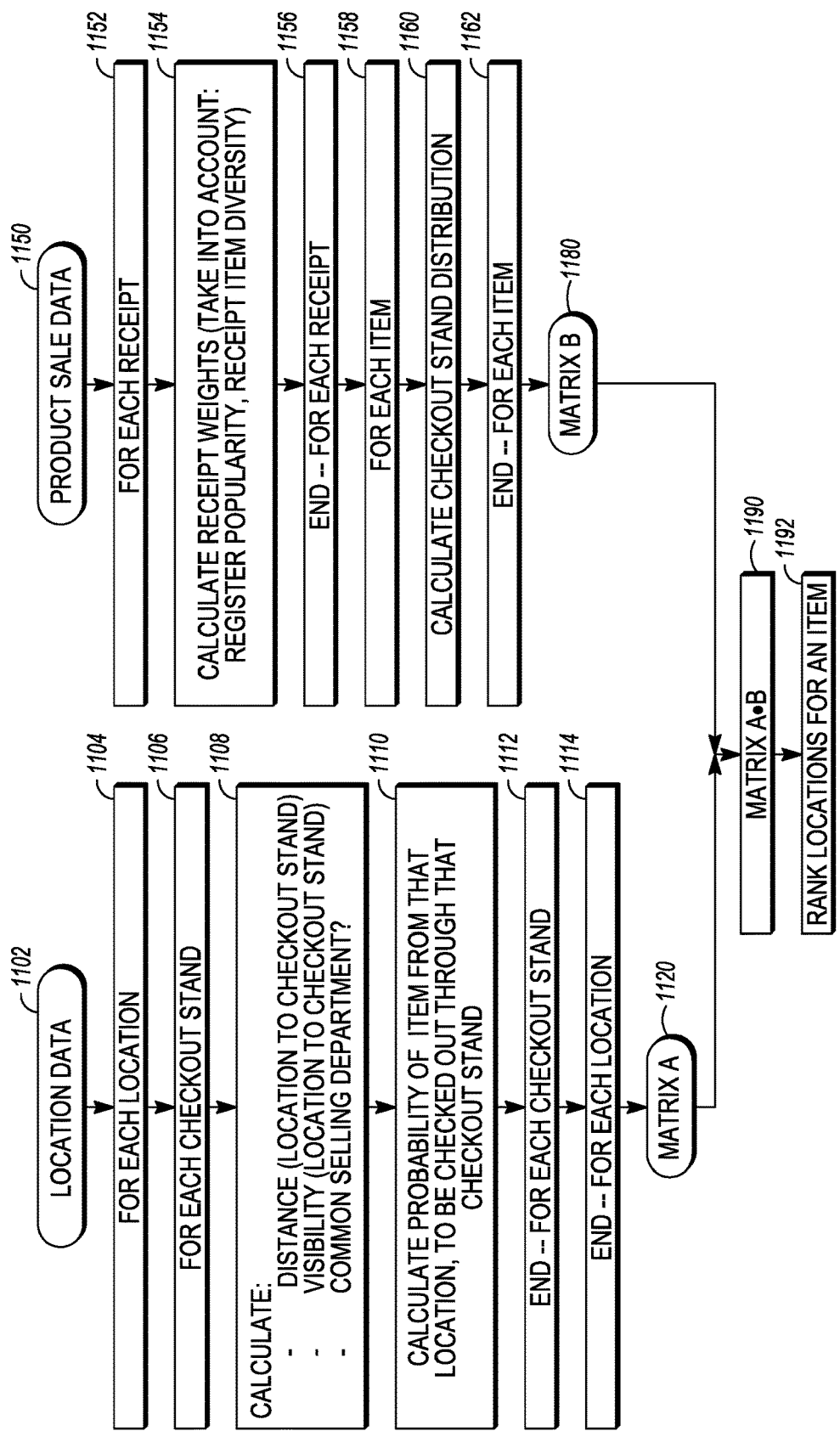
FIG. 9 shows an exemplary flow chart for creating memory matrix A, for creating memory matrix B, and for generating the item-to-location probability matrix (memory matrix A·B), to assign a most probable location for any given item within the store or venue.

FIG. 9 shows an exemplary flow chart for creating memory matrix A, for creating memory matrix B, and for generating the item-to-location probability matrix (memory matrix A·B), to assign a most probable location for any given item within the store or venue.

In particular, as shown in FIG. 9, the memory matrix A 1120 is created using location data 1102 as input.

A first nested FOR loop is created by steps 1104 and 1114 to loop around for each location, and a second nested FOR loop is created by steps 1106 and 1112 to loop around for each checkout stand.

The body 1108 of the FOR loop 1106, 1112 determines a distance between each location and each checkout stand; determines a visibility of each location to each checkout stand; and determines a common selling department.

Memory matrix B 1150 is created using point of sale (POS) transaction receipt data 1150 as input.

A first FOR loop 1152, 1156 loops around for each POS transaction to determine weightings for the POS transaction receipt data for each item, taking into account various factors including register popularity, and shopping basket diversity.

A second FOR loop 1158, 1162 loops around for each item to determine its checkout stand distribution.

A dot product matrix A·B 1190 is created by performing a dot product between memory matrix A 1120 and memory matrix B 1180.

The transaction based location assignment system ranks the locations for each item 1192, and assigns the highest ranked, most probable location to the item based on the POS transaction receipt data.

Figure 10:
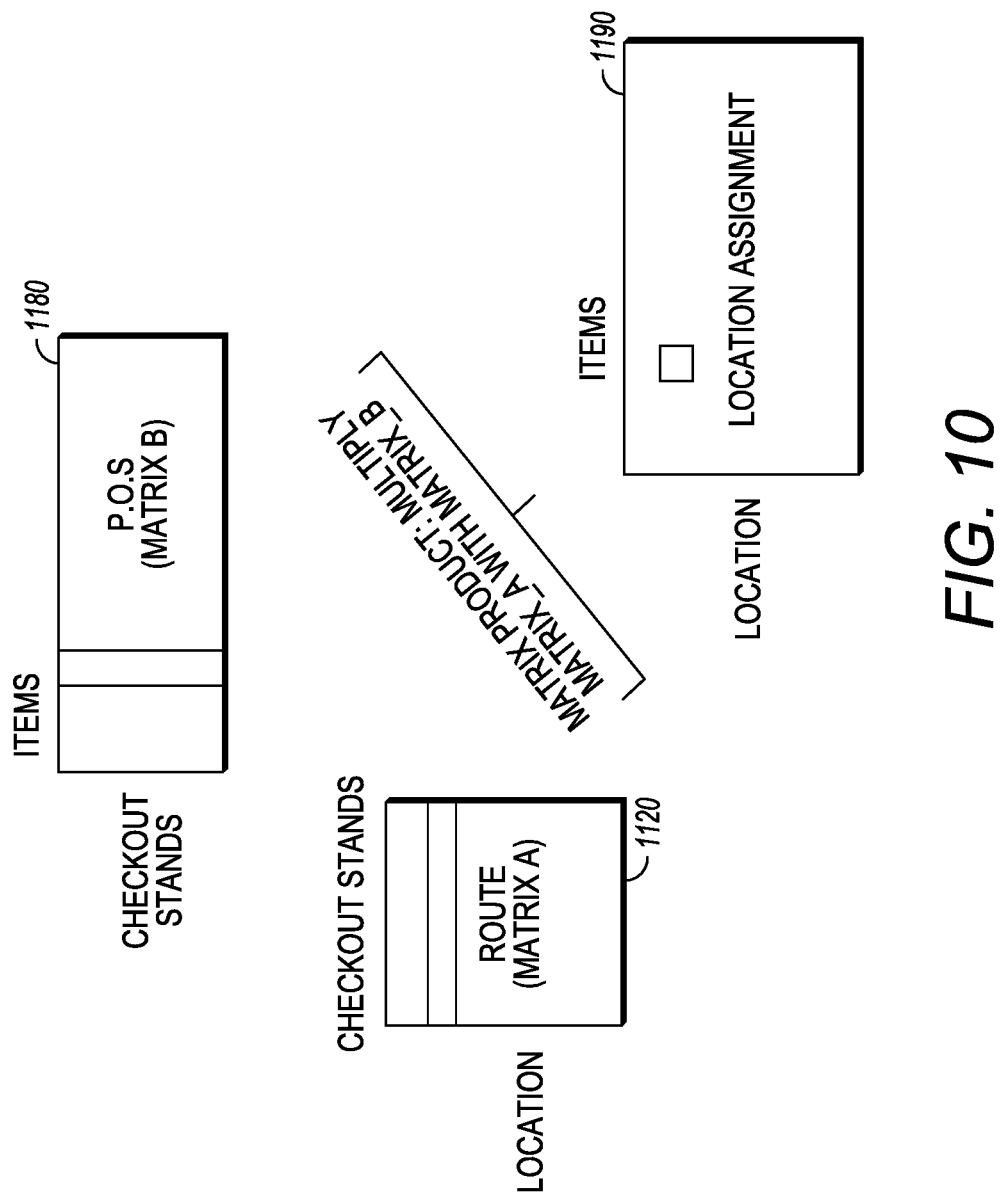
FIG. 10 depicts creation of the item-to-location probability matrix (location assignment memory matrix) from the Dot product between a memory route matrix A and a point of sale (POS) transactional data matrix B. Note that Matrix B needs to be transposed to have the correct matrix multiplication to take place.

FIG. 10 depicts creation of the item-to-location (or item cluster-to-location as explained below with reference to FIG. 11) probability matrix (location assignment memory matrix) A·B 1190 as a Dot product between the memory matrix A 1120, and a point of sale (POS) transaction receipt data matrix B 1180. Note that Matrix B needs to be transposed to have the correct matrix multiplication to take place.

Extending Memory Matrix B Beyond Checkout Stand-to-Items Matrix

Figure 11:
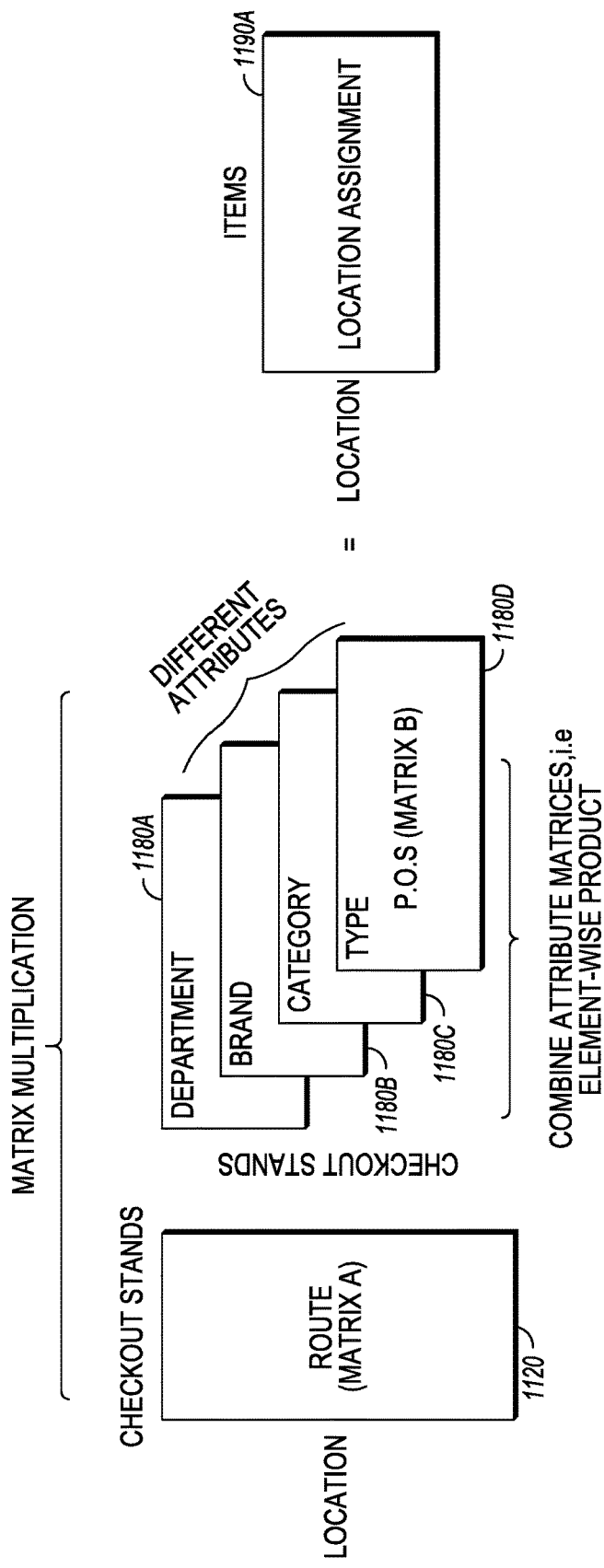
FIG. 11 depicts extension of the item-to-location probability matrix (location assignment memory matrix) from the Dot product between a memory route matrix A and a point of sale (POS) transactional data matrix B using item clusters based on one or more attributes of the items, e.g., same type items, same category of items, same brand of items, and/or same department for the items.

FIG. 11 depicts extension of the item-to-location probability matrix (location assignment memory matrix) from the Dot product between a memory matrix A and a point of sale (POS) transaction receipt data matrix B using item clusters, instead of individual items, clustered together based on one or more attributes of the items, e.g., same type items 1180d, same category of items 1180c, same brand of items 1180b, and/or same department for the items 1180a.

Apart from good precision, coverage (meaning how many items can be assigned with enough confidence) is also crucial for product location assignment. In other words, probability statistics are generally more accurate with a larger sampling. However, a given sampling of point of sale (POS) transaction receipt data might not contain a statistically significant number of sales for some or many of the catalog of items available in a store. Thus, in other embodiments, in order to increase the coverage, instead of using individual items in the created memory matrices, groupings of items, or 'item clusters', are used.

Both accuracy of the location assignment as well as product coverage of location assignment can be substantially improved if items are aggregated into 'item clusters'. For example, shirt items of different sizes but otherwise having the same style and color might be grouped together because they are very likely co-located within the store, and thus be considered as an individual 'item cluster'. Use of item clusters can result in more efficient operation of the transaction based location assignment system.

Item clusters are formed by groups of items having a specific attribute of the product in common, e.g., items within the same "department", or items having the same "brand", or items having the same "product_category", or items having the same type. While these particular attributes are shown in FIG. 11, the principles of the present invention relate equally to other attributes of items useful for grouping items together into item clusters, particularly to attributes which relate to items that are co-located within a store.

For purposes of creating a dot product between memory matrix A and memory matrix B, the item clusters must be the same grouping of items in both memory matrix A and memory matrix B.

In disclosed embodiments, the transaction based location assignment system first assigns locations based on point of sale (POS) transaction receipt data only for well distilled or most popular individual items (i.e., high-sale items). After these most popular items have locations assigned based on POS transaction receipt data, then and only then less popular, similar items are matched to a popular item within a same item cluster, and the location of the less popular items can be assigned the same location as the similar more popular items. This technique may also be used for assignment of new items, or new lines of items introduced to the store. For example, a new line of fashion merchandise may be assigned a location of a similar, popular item based on the new item's inclusion in an item cluster including a high-sale item.

The transaction based location assignment system may aggregate items into item clusters after the most probable location is assigned to the high-sale individual items. Similarly, the transaction based location assignment system may aggregate all items into item clusters initially, and perform location assignment of all items based on their inclusion in a given item cluster.

Point of sale based, checkout stand anchored location assignment of products is a very scalable solution for large store and multi-store retailers and department stores. The present invention assumes that some location anchor is available, as is a regular feed of data that ties items (products) to the location anchors, as well as location data that ties the location anchors to other locations in the store without any anchors. In current embodiments of the invention, checkout stands serve as location anchors, and point of sale (POS) terminal checkout receipt data serves to tie the items to checkout stands.

Product similarity, department similarity and store-similarity may serve as a fall-back mechanism for items with limited or no connections to location anchor points in the store.

Thus, the transaction based location assignment system may assign location to the frequently purchased items in a given store, defined as items sold more times in the store than a pre-set but configurable threshold, e.g., having more than 15 POS transaction receipts over the sampled time period(s).

Thereafter, location assignment of the not-so-frequently-purchased items may be performed in one or more of the following ways:

(a) Either before the matrix multiplication on memory matrix B:
  Expand Matrix B—from the register_cluster-to-item matrix to 'item clusters of similar items' matrix, thereby the resulting memory matrix AB will contain physical locations to item_clusters instead of just individual items only;

(b) or after the matrix multiplication on memory matrix AB:

Assign similar items to the same location with the same probabilities of the not-so-frequent items to their similar frequently purchased item counterparts; or (c) a combination of (a) and (b) above:

That is, both before and after generation of memory matrix AB.

Note that determining a similarity of items can be determined in a variety of ways, e.g., title similarity, item description similarity, upc similarity, same attributes of items except the size of the item (e.g., medium, large, extra large), or same attributes of items except the color of the item, or the combination thereof.

The present invention is sensitive and has the capability to recognize and accommodate movement of items inside the store on a daily basis, and assigns location based on the items new location.

The present invention recognizes that items (products) within any given department store change each season, and thus items tend to move and/or become replaced. Items change and move based on fashion as well. These are relatively fast changes that make a complete manual location assignment of product impractical and cumbersome. Any location information obtained by audit of the items will become inaccurate typically after as few as 3 weeks, and practically obsolete after about 8 weeks. Multiply this by the hundreds and hundreds of stores in a typical large retail chain, and manual audit of item location becomes impossible. The present invention provides a scalable solution capable of assigning location to items for a given retail chain on a daily basis.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

Unless the context clearly requires otherwise, throughout the description and the claims, references are made herein to routines, subroutines, and modules. Generally it should be understood that a routine is a software program executed by computer hardware and that a subroutine is a software program executed within another routine. However, routines discussed herein may be executed within another routine and subroutines may be executed independently, i.e., routines may be subroutines and vice versa. As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs or routines having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single computer, processor or controller node or distributed among a plurality of computer, processor or controller nodes running in parallel, concurrently, sequentially or a combination.

While the invention has been described with reference to the exemplary embodiments thereof, those skilled in the art will be able to make various modifications to the described embodiments of the invention without departing from the true spirit and scope of the invention.

What is claimed is:

1. A method of building a physical location computer database including assigned location for items located in a store, the method comprising:

forming a first memory matrix including a plurality of logical columns each comprising an identity of one of a corresponding plurality of checkout stands in a given store, the first memory matrix further including a plurality of logical rows each associated with the plurality of logical columns, each of the plurality of logical rows corresponding to a location within the store where an item may be located;

forming a second memory matrix including a plurality of logical columns corresponding to the plurality of checkout stands in the given store, the second memory matrix further including a plurality of logical rows each associated with the plurality of logical columns, each of the plurality of logical rows corresponding to an item purchased in the store at the corresponding one of the checkout stands in the intersecting one of the plurality of logical columns;

performing a best fit of the second memory matrix with the first memory matrix to produce a distribution of probable ones of probable locations within the store that the purchased item was located;

ranking, with a physical processor, the distribution of probable ones of probable locations of each purchased item, based on point of sale (POS) transaction data;

extracting from the probability memory matrix, a highest ranked probable location for each item; and storing in a logical row in the physical location computer database, the extracted highest ranked probable location for each of a plurality of items, wherein the best fit generates the most probable location of the plurality of items based on transaction data obtained from the plurality of checkout stands, and the highest ranked probable location for each of the plurality of items is assigned as the location of the respective one of the plurality of items.

2. The method of building a physical location computer database including assigned location information for items located in a store according to claim 1, wherein the best fit comprises:

forming a third memory matrix comprising a dot product of the first memory matrix and the second memory matrix.

3. The method of building a physical location computer database including assigned location information for items located in a store according to claim 1, wherein:
    each of the plurality of items is a cluster of products in the store having at least one common attribute.

4. The method of building a physical location computer database including assigned location information for items located in a store according to claim 3, wherein the at least one common attribute comprises:
    a same department within the store.

5. The method of building a physical location computer database including assigned location information for items located in a store according to claim 3, wherein the at least one common attribute comprises:
    a same brand.

6. The method of building a physical location computer database including assigned location information for items located in a store according to claim 3, wherein the at least one common attribute comprises:
    a same category.

7. The method of building a physical location computer database including assigned location information for items located in a store according to claim 3, wherein the at least one common attribute comprises:
    a same type product.

8. The method of building a physical location computer database including assigned location information for items located in a store according to claim 3, wherein the at least one common attribute comprises:
    a same department within the store;
    a same brand;
    a same category; and
    a same type product.

9. A non-transient computer-readable storage medium having stored thereon instructions that, when executed on a processor, configure the processor to build a physical location computer database including assigned location information for items located in a store, by:
    forming a first memory matrix including a plurality of logical columns each comprising an identity of one of a corresponding plurality of checkout stands in a given store, the first memory matrix further including a plurality of logical rows each associated with the plurality of logical columns, each of the plurality of logical rows corresponding to a location within the store where an item may be located;
    forming a second memory matrix including a plurality of logical columns corresponding to the plurality of checkout stands in the given store, the second memory matrix further including a plurality of logical rows each associated with the plurality of logical columns, each of the plurality of logical rows corresponding to an item purchased in the store at the corresponding one of the checkout stands in the intersecting one of the plurality of logical columns;
    performing a best fit of the second memory matrix with the first memory matrix to produce a distribution of probable ones of probable locations within the store that the purchased item was located;
    ranking, with a physical processor, the distribution of probable ones of probable locations of each purchased item, based on point of sale (POS) transaction data;
    extracting from the probability memory matrix, a highest ranked probable location for each item; and
    storing in a logical row in the physical location computer database, the extracted highest ranked probable location for each of a plurality of items,
    wherein the best fit generates the most probable location of the plurality of items based on transaction data obtained from the plurality of checkout stands, and the highest ranked probable location for each of the plurality of items is assigned as the location of the respective one of the plurality of items.

10. The non-transient computer-readable storage medium having stored thereon instructions that, when executed on a processor, configure the processor to build a physical location computer database including assigned location information for items located in a store according to claim 9, further by:
    forming a third memory matrix comprising a dot product of the first memory matrix and the second memory matrix.

11. The non-transient computer-readable storage medium having stored thereon instructions that, when executed on a processor, configure the processor to build a physical location computer database including assigned location information for items located in a store according to claim 9, wherein:
    each of the plurality of items is a cluster of products in the store having at least one common attribute.

12. The non-transient computer-readable storage medium having stored thereon instructions that, when executed on a processor, configure the processor to build a physical location computer database including assigned location information for items located in a store according to claim 9, wherein the at least one common attribute comprises:
    a same department within the store.

13. The non-transient computer-readable storage medium having stored thereon instructions that, when executed on a processor, configure the processor to build a physical location computer database including assigned location information for items located in a store according to claim 9, wherein the at least one common attribute comprises:
    a same brand.

14. The non-transient computer-readable storage medium having stored thereon instructions that, when executed on a processor, configure the processor to build a physical location computer database including assigned location information for items located in a store according to claim 9, wherein the at least one common attribute comprises:
    a same category.

15. The non-transient computer-readable storage medium having stored thereon instructions that, when executed on a processor, configure the processor to build a physical location computer database including assigned location information for items located in a store according to claim 9, wherein the at least one common attribute comprises:
    a same type product.

16. The non-transient computer-readable storage medium having stored thereon instructions that, when executed on a processor, configure the processor to build a physical location computer database including assigned location information for items located in a store according to claim 9, wherein the at least one common attribute comprises:
    a same department within the store;
    a same brand;
    a same category; and
    a same type product.

* * * * *